(12) United States Patent
Van Der Wal

(10) Patent No.: US 10,670,748 B2
(45) Date of Patent: Jun. 2, 2020

(54) SYSTEMS AND METHODS OF A MARINE GEOPHYSICAL DAMPER SYSTEM

(71) Applicant: PGS Geophysical AS, Oslo (NO)

(72) Inventor: Anthony Van Der Wal, Kuala Lumpur (MY)

(73) Assignee: PGS GEOPHYSICAL AS, Oslo (NO)

(*) Notice: Subject to any disclaimer, the term of this patent is extended or adjusted under 35 U.S.C. 154(b) by 364 days.

(21) Appl. No.: 15/643,767

(22) Filed: Jul. 7, 2017

(65) Prior Publication Data

US 2018/0052244 A1 Feb. 22, 2018

Related U.S. Application Data

(60) Provisional application No. 62/376,483, filed on Aug. 18, 2016.

(51) Int. Cl.
| | | |
|---|---|---|
| *G01V 1/20* | (2006.01) | |
| *G01V 1/38* | (2006.01) | |
| *B63B 21/16* | (2006.01) | |
| *B63B 22/00* | (2006.01) | |

(Continued)

(52) U.S. Cl.
CPC ............ *G01V 1/201* (2013.01); *B63B 21/16* (2013.01); *B63B 21/663* (2013.01); *B63B 22/00* (2013.01);
(Continued)

(58) Field of Classification Search
CPC .... G01V 1/201; G01V 1/38; G01V 2001/207; G01V 2210/1423; G01V 1/3808; G01V 2200/14; B63B 39/005; B63B 22/00; B63B 21/16; B63B 21/663; B63B 2022/006; B63B 2211/02
(Continued)

(56) References Cited

U.S. PATENT DOCUMENTS

| 4,742,998 A | 5/1988 | Schubert |
| 4,981,309 A | 1/1991 | Froeschle et al. |
| (Continued) | | |

FOREIGN PATENT DOCUMENTS

| DE | 10161972 A1 | 6/2003 |
| WO | 2014121029 A2 | 8/2014 |

OTHER PUBLICATIONS

Patrascu, Daniel, "How Magnetorheological Suspension Works," autoevolution.com, Jul. 20, 2009, 5 pages.

(Continued)

*Primary Examiner* — Daniel L Murphy

(57) ABSTRACT

Marine geophysical damper system. At least some of the example embodiments are methods of manufacturing a geophysical data product including obtaining geophysical data by a sensor streamer; and recording the geophysical data on a tangible computer-readable medium. The obtaining may include: towing a sensor streamer and a dilt buoy, the dilt buoy coupled to a proximal end of the sensor streamer by a line, the sensor streamer is submerged in a body of water and the dilt buoy is disposed at the surface the body of water; and during the towing measuring movement of the dilt buoy caused by surface wave action; and selectively damping relative movement between the dilt buoy and the sensor streamer, the relative movement caused by the surface wave action, and the selectively damping by a damper associated with the line.

19 Claims, 10 Drawing Sheets

(51) Int. Cl.
   *B63B 39/00*      (2006.01)
   *B63B 21/66*      (2006.01)
(52) U.S. Cl.
   CPC .............. *B63B 39/005* (2013.01); *G01V 1/38* (2013.01); *B63B 2022/006* (2013.01); *B63B 2211/02* (2013.01); *G01V 1/3808* (2013.01); *G01V 2001/207* (2013.01); *G01V 2200/14* (2013.01); *G01V 2210/1423* (2013.01)
(58) Field of Classification Search
   USPC ......................................................... 367/18
   See application file for complete search history.

(56)           References Cited

U.S. PATENT DOCUMENTS

| | | |
|---|---|---|
| 6,260,675 B1 | 7/2001 | Muhlenkamp |
| 7,426,438 B1* | 9/2008 | Robertsson ............ G06Q 30/06 |
| | | 702/14 |
| 7,686,144 B2 | 3/2010 | Shibayama et al. |
| 2017/0242154 A1* | 8/2017 | Granholt .................. G01V 1/38 |

OTHER PUBLICATIONS

Song, Xubin, "Cost-Effective Skyhook Control for Semiactive Vehicle Suspension Applications," The Open Mechanical Engineering Journal, 2009, pp. 17-25, vol. 3, Eaton Corporation, Southfield, MI, USA.

"Adaptive Vibration Damping with Magnetorheological Fluids," Fraunhofer Institute for Silicate Research ISC, 2017, 2 pages, Germany.

* cited by examiner

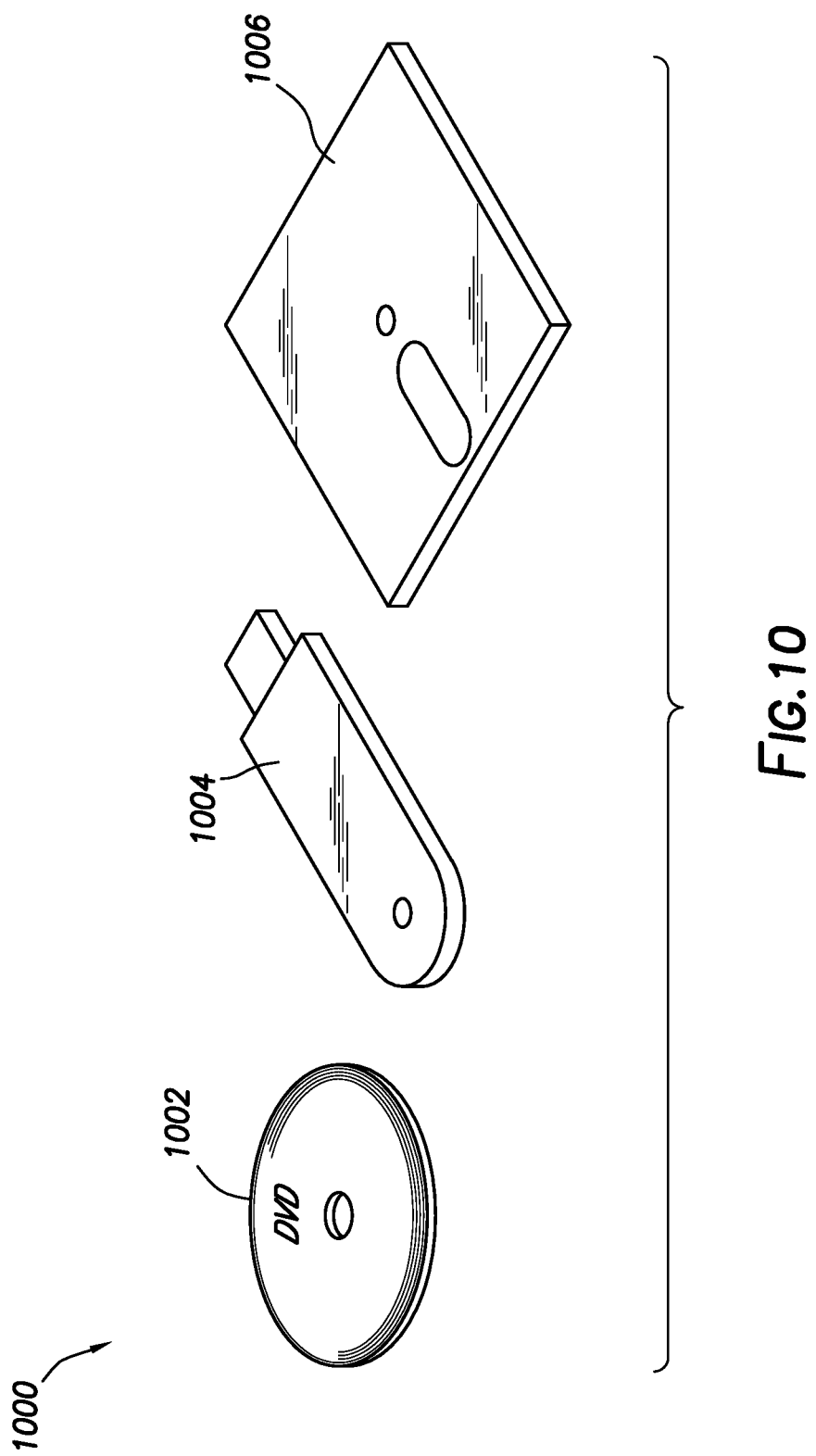

SYSTEMS AND METHODS OF A MARINE GEOPHYSICAL DAMPER SYSTEM

CROSS-REFERENCE TO RELATED APPLICATIONS

This application claims the benefit of provisional application Ser. No. 62/376,483 filed Aug. 18, 2016 titled "Damping of Towed Marine Seismic Cables," which is hereby incorporated by reference as if reproduced in full below.

BACKGROUND

Marine geophysical survey systems are used to acquire data (e.g., seismic, electromagnetic) regarding Earth formations below a body of water such as a lake or ocean. The marine geophysical survey systems comprise a complex array of buoys, lines, and paravane systems in order to properly orient streamers towed behind the survey vessel.

Weather and related sea conditions may adversely affect the ability to perform a marine geophysical survey. In adverse weather conditions, the surface waves may adversely affect operation, such as by imparting vibrations from surface buoys to the streamers such that the vibrations interfere with detection of seismic signals of interest.

BRIEF DESCRIPTION OF THE DRAWINGS

For a detailed description of exemplary embodiments, reference will now be made to the accompanying drawings (not necessarily to scale) in which:

FIG. 10 shows example non-volatile tangible computer-readable memory devices.

DEFINITIONS

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Damp" or "damping" shall mean to restrict or reduce amplitude of vibrations imparted to an object.

"Magneto-rheological damper" shall mean a damping device whose damping characteristics are adjustable by selective control of a magnetic field within the device, the magnetic field within the magneto-rheological damper electrically controlled.

"About" shall mean within +/−5.0% of the recited value.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to methods and related systems of selectively damping vibrations caused by surface buoys (e.g., lead or dilt buoys, or tail buoys) from reaching underlying sensor streamers, particularly in the frequency range of interest for seismic signals of 2 Hertz and above. More particularly, various embodiments are directed to use of damping systems to selectively damp vibrations of the surface buoys imparted to the sensor streamers, where the damping systems are electrically controlled. The specification first turns to an illustrative system to orient the reader.

Figure 1:
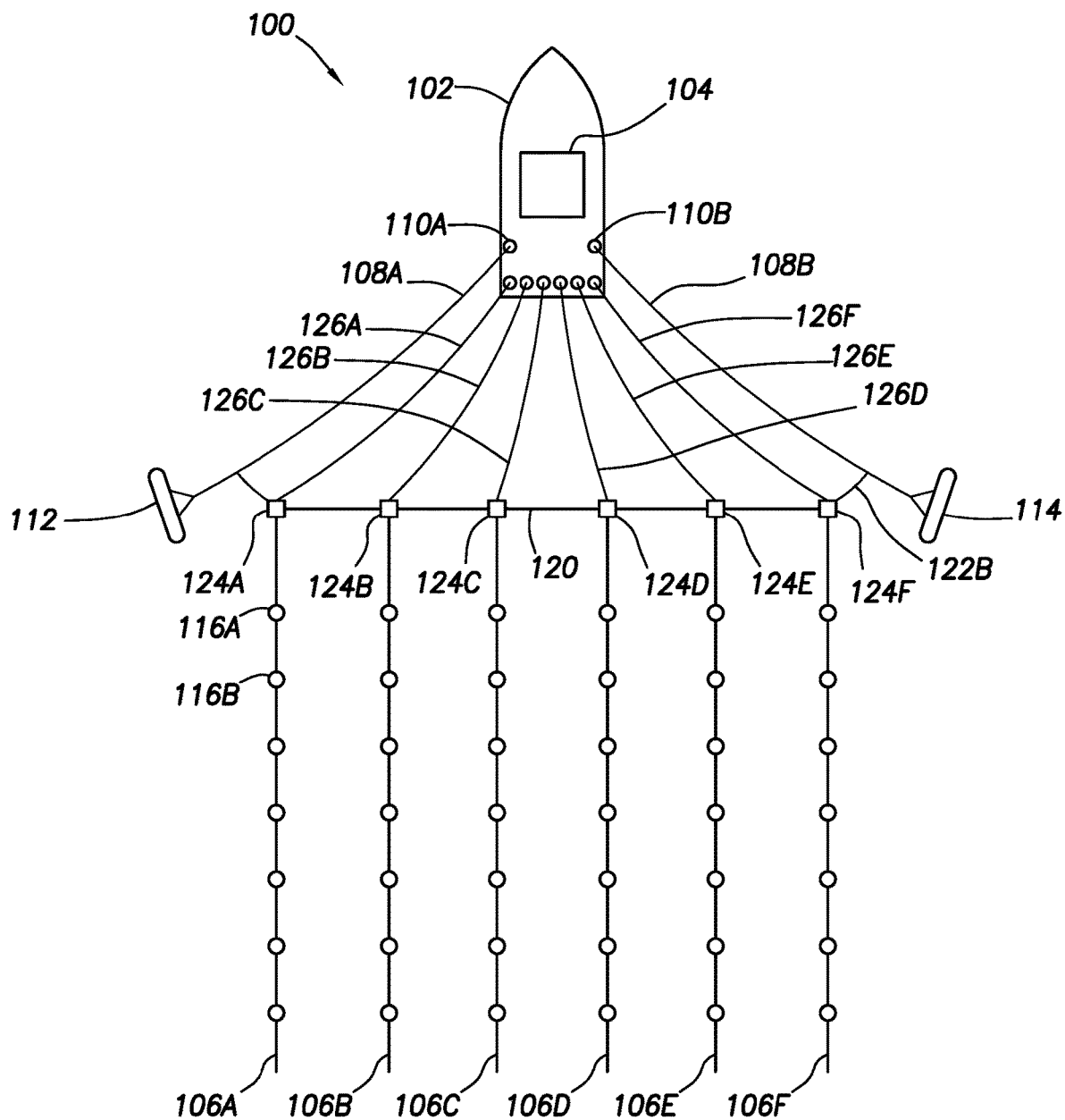
FIG. 1 shows an overhead view of a marine geophysical survey system in accordance with example embodiments.

FIG. 1 shows an overhead view of a geophysical survey system 100 in accordance with at least some embodiments. In particular, FIG. 1 shows a tow vessel 102 having onboard equipment 104, such as navigation, energy source control, and data recording equipment. Tow vessel 102 is configured to tow one or more sensor streamers 106A-F through the water. While FIG. 1 illustratively shows six sensor streamers 106, any number of sensor streamers 106 may be equivalently used.

The sensor streamers 106 are coupled to towing equipment that maintains the sensor streamers 106 at selected lateral positions with respect to each other and with respect to the tow vessel 102. The towing equipment may comprise two paravane tow lines 108A and 108B (sometimes referred to as "super-wide" ropes) each coupled to the vessel 102 by way of winches 110A and 1106, respectively. The winches enable changing the deployed length of each paravane tow line 108A,B. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle" (not specifically numbered). The paravanes 112 and 114 are each configured to provide a lateral force component to the various elements of the survey system when the paravanes are towed through the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

The sensor streamers 106 are each coupled at the ends nearest the tow vessel 102 (i.e., their proximal ends) to a respective lead-in cable termination 124A-F. The lead-in cable terminations 124A-F are coupled to or are associated with the spreader lines 120 so as to control the lateral positions of the sensor streamers 106 with respect to each other and with respect to the tow vessel 102. Electrical and/or optical connections between the appropriate components in the onboard equipment 104 and the sensors (e.g., 116A, 116B) in the sensor streamers 106 may be made using lead-in cables 126A-F. Much like the paravane tow lines 108A,B associated with respective winches 110, each of the lead-in cables 126 may be deployed by a respective winch or similar spooling device (not specifically numbered) such that the deployed length of each lead-in cable 126 can be changed. Although not shown in FIG. 1, each sensor streamer 106A-F may be associated with one or more buoys to assist with depth control of the sensor streamers.

Figure 2:
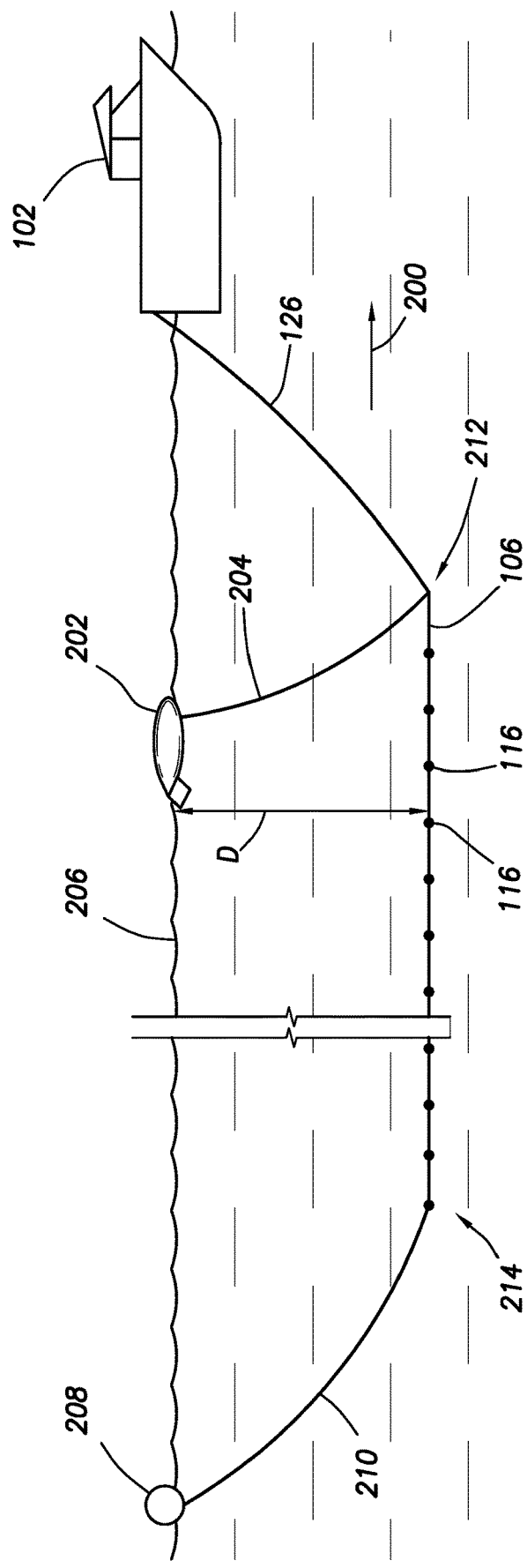
FIG. 2 shows a side elevation view of a marine geophysical survey system in accordance with example embodiments.

FIG. 2 shows a side elevation view of an example sensor streamer 106 (which could be any of the sensor streamers 106A-F of FIG. 1) in an operational configuration. In particular, FIG. 2 shows tow vessel 102 towing sensor streamer 106 by way of the lead-in cable 126, where the tow vessel 102 tows the sensor streamer in a tow direction 200 as indicated. The proximal end of the sensor streamer 106 may be coupled to a lead or dilt buoy 202 by way of a line 204. The dilt buoy 202 may serve several purposes in a geophysical survey system. For example, the dilt buoy 202 may mark on the surface of the water the location of the proximal end of the sensor streamer 106. Moreover, and related to the further discussion below, the dilt buoy 202 provides depth support to the sensor streamer to help maintain the proximal end of the sensor streamer 106 at a predetermined depth D below the surface 206 of the water. In example systems, the dilt buoy 202 may have a displacement of 2-3 tons of water, and some or all the displacement may be used to provide depth support for the sensor streamer 106.

The example system of FIG. 2 further shows a tail buoy 208 coupled to the distal end of the sensor streamer 106 by way of line 210. Like the dilt buoy 202, the tail buoy 208 may mark the distal end of the sensor streamer 106, and likewise may support the distal end of the sensor streamer 106. While FIG. 2 shows only a single sensor streamer 106, the discussion is equally valid for some or all the sensor streamers 106 of a geophysical survey system.

Various embodiments were developed in the context of the dilt buoy 202 and the proximal end 212 of the sensor streamer 106. Based on the developmental context, and in order to frame the context of the various improvements disclosed herein, the specification initially focuses on the dilt buoy 202 and the proximal end 212 of the sensor streamer 106. However, the discussion shall not be viewed as a limitation of the applicability of the underlying ideas, which may be applied to many portions of the sensor streamer spread (such as the tail buoy 208). Being mechanically coupled to the sensor streamer 106, the dilt buoy 202 may impart unwanted vibrational motion to the sensor streamer 106, particularly in choppy seas. That is, as the tow vessel 102 pulls the sensor streamer 106 through the water in tow direction 200, the dilt buoy 202 is likewise pulled along based on tow force provided by the lead-in cable 126 and the line 204. As the dilt buoy 202 moves along the surface of the water 206, the dilt buoy 202 encounters waves of varying magnitude and frequency. For example, most open ocean locations experience ocean swell waves, which are waves created by distant weather and seismic events (i.e., not created by immediate local winds). Ocean swell waves have long wavelength, and thus have frequency lower than 1 Hertz (e.g., 0.1 Hertz and lower) and in most cases having periods of 6 to 20 seconds. On the other hand, wind waves are waves created by local winds, and in most cases wind waves have shorter wavelength than ocean swell waves. Thus, wind waves may cause vibratory motion of the dilt buoy 202 within a range of frequencies also of interest with respect to seismic signals.

Still referring to FIG. 2, as the example dilt buoy 202 encounters various surface waves, the surface waves cause movement that includes a vertical component. It follows that as the dilt buoy 202 encounters surface waves of particular frequency, in directly coupled systems the up/down movement of the dilt buoy 202 is transferred directly to the proximal end of the sensor streamer 106 by the line 204. The movement is imparted to the sensor streamer 106 and induces vertically oriented mechanical vibrations that then propagate along the sensor streamer 106. In the case of the dilt buoy 202 and line 204 coupled to the proximal end 212 of the sensor streamer 106, the mechanical vibrations propagate from the proximal end toward and sometimes to the distal end. Propagation of mechanical vibrations in sensor streamers is greatest where tension is higher, and thus the propagation is more pronounced near the proximal end 212 of the sensor streamer 106. Stated otherwise, the attenuation of mechanical vibration as a function of distance propagated is lower in areas of higher tension (i.e., at and near the proximal end), and attenuation is higher in the areas of lower tension (i.e., at and near the distal end 214), and thus vertically oriented mechanical vibrations imparted at the proximal end 212 of the sensor streamer 106 by the dilt buoy 202 have greatest impact.

The sensors 116 of the example sensor streamer 106 may take many forms. In cases where the geophysical survey has a seismic component, the sensors may include co-located hydrophones and particle motion sensors (e.g., accelerometers or velocimeters). Hydrophones detect pressure fluctuations associated with passing seismic waves, and are relatively unaffected by mechanical vibrations in the sensor streamer 106. However, particle motion sensors detect slight movements or particle motion associated with passing seismic waves and in addition to detecting movement associated with seismic waves particle motion sensors are also susceptible to noise in the form of mechanical vibrations propagating along the sensor streamer. Further still, in some geophysical survey systems, the particle motion sensors are gimballed to be particularly sensitive to the vertical component of passing seismic waves. In yet still other cases, multiple particle motion sensors are co-located (e.g., three set to be sensitive in the three orthogonal directions) such that the vertical component of passing seismic waves can be calculated. Thus, vertical mechanical vibrations propagating along the sensor streamer as induced by the dilt buoy 202 can overlap and/or interfere with detection of passing seismic waves.

Figure 3:
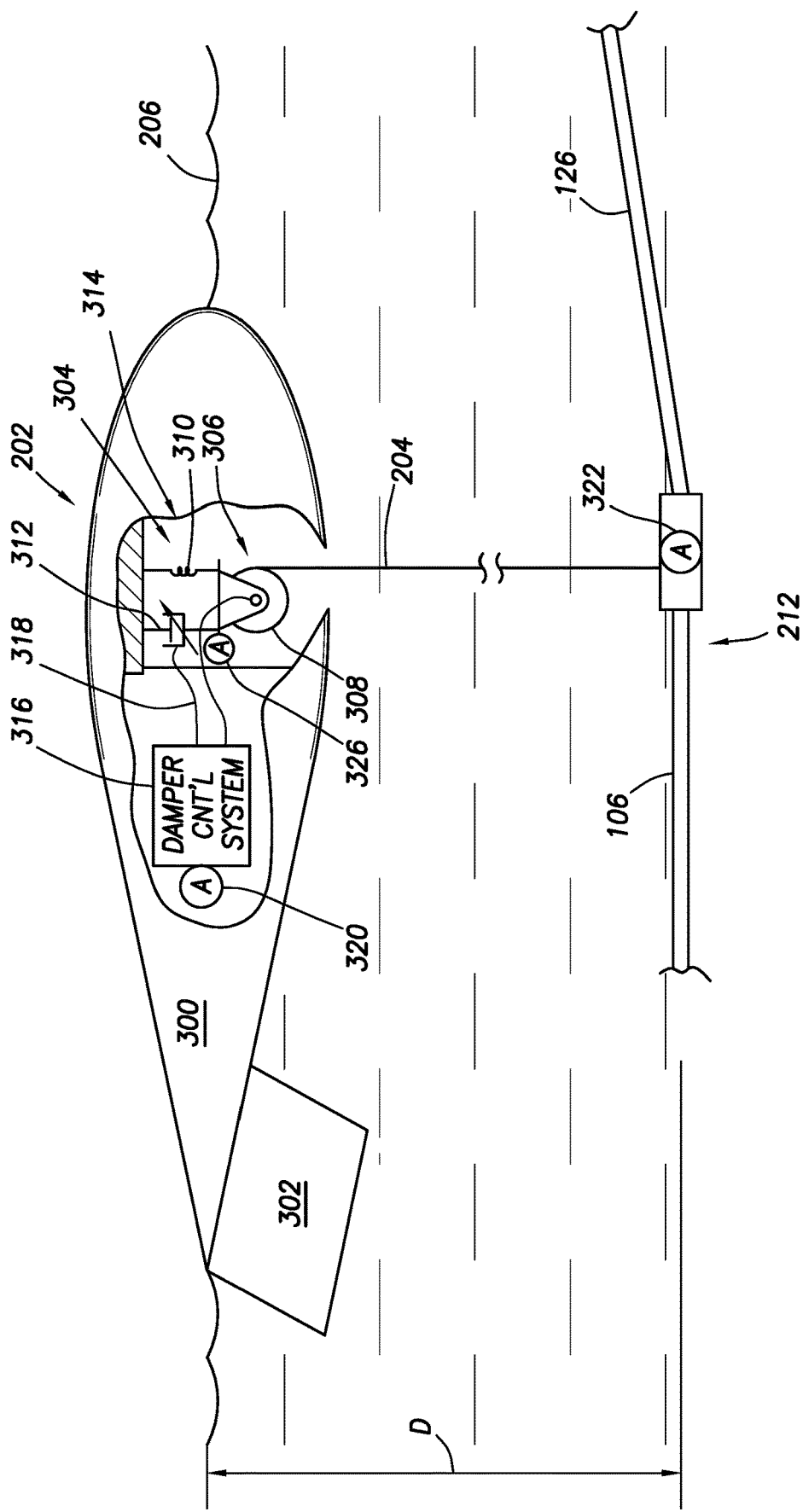
FIG. 3 shows a partial cross-sectional side elevation view of a buoy and sensor streamer in accordance with example embodiments.

In order to reduce the amount of motion in the sensor streamer 106 induced by the lead or dilt buoy 202, example systems selectively damp relative movement between the dilt buoy 202 and the sensor streamer 106. Stated otherwise, the example systems selectively damp vibrations imparted to the sensor streamer from the main body of the dilt buoy, the selective damping by way of a damper associated with the line 204 between the dilt buoy 202 and the proximal end 212 of the sensor streamer 106. FIG. 3 shows an example system for implementation of selective damping of vibrations of the dilt buoy imparted to the sensor streamer. In particular, FIG. 3 shows an example dilt buoy 202 coupled to the proximal end 212 of the sensor streamer 106 by way of line 204. In the example system, the dilt buoy 202 defines an elongate main body 300 that is configured to float at the surface 206 of the water. The elongate main body 300 is configured to be towed through the water, and, in the example system shown, the exterior surface of the elongate main body 300 defines a streamlined body shape to reduce the drag coefficient while being towed. The example dilt buoy 202 further includes a fin or rudder 302 to help maintain directional stability of the dilt buoy 202.

The dilt buoy 202 further defines an internal volume 304 that is open or exposed to the water, and in the example configuration a winch system 306 is disposed within the internal volume 304. The line 204 that couples the dilt buoy 202 to the sensor streamer 106 is wrapped around a spool 308 of the winch system 306 such that the depth of the sensor streamer 106 may be set (by the winch system 306) to a predetermined depth during geophysical surveys, and when needed the sensor streamer 106 can be brought to the surface 206 by the winch system 306. Moreover, line 204 tows the dilt buoy 202 through the water during geophysical surveys (i.e., the winch system 306 is locked to movement during towing). In the example system of FIG. 3, the winch system 306 is suspended within the elongated main body 300 by a damping or suspension system 314 comprising a spring 310 and damper 312.

The damper 312 may be an electrically controlled damper, such as a magneto-rheological damper (discussed more below). Damper 312 is electrically coupled to a damper control system 316, and the damper control system 316 may be disposed within the elongate main body 300. The damper control system 316 may take any suitable form, such as a computer system with a processor and memory executing programs, a Field Programmable Gate Array (FPGA) programmed to perform the recited tasks, an analog system designed and constructed to perform the recited task, a programmable logic controller (PLC), and the like. In the example systems, the damper control system 316 is disposed within the elongate main body 300 in a cavity or volume that is sealed from exposure to the water, but the damper control system 316 is nevertheless electrically coupled to the damper 312, for example, by way of communicative conductors 318 (e.g., electrical conductors, or optical fibers). The damper control system 316 is configured to control damper 312 in such a way as to reduce movement of the elongate main body 300 imparted to the winch system 306, and thus to reduce vibrations imparted to the sensor streamer 106 through the line 204.

Still referring to FIG. 3, in example implementations the damper control system 316 selectively damps (discussed more below) by controlling the damping force provided by the damper 312 responsive to signals read by one or more accelerometers. That is, an accelerometer is mechanically coupled to the elongate main body 300 to measure movement of the elongate main body 300 caused by wave action. Inasmuch as the damper control system 316 is mechanically and rigidly coupled to the elongate main body 300, the accelerometer may thus be co-located with the damper control system 316, as illustrated by accelerometer 320. As discussed more below, control of damping force provided by the damper 312 may be based on relative movement as between the dilt buoy 202 (as measured by the accelerometer 320) and the sensor streamer 106. Thus, in some systems a second accelerometer is associated with the sensor streamer 106. The association with the sensor streamer 106 may take many forms. For example, in some cases an accelerometer may be disposed at the proximal end 212 of the sensor streamer 106, as shown by accelerometer 322. In such circumstances, the line 204 may be a cable having communication conductors therein (e.g., electrical conductors, optical fibers), and thus the damper control system 316 may be communicatively coupled the accelerometer 322 by way of the line.

The sensor streamer 106 is mechanically coupled to the dilt buoy 202 by way of the winch system 306 and line 204, and the winch system 306 is suspended by the suspension system 314. The line 204 is under constant tension to provide depth support to the sensor streamer. Thus, movement of the winch system 306 may be directly proportional to movement of the sensor streamer 106. It follows that in an alternative embodiment an accelerometer may be rigidly and mechanically coupled to the winch system 306, shown by accelerometer 326. Accelerometer 326, when implemented, is communicatively coupled to the damper control system 316. Movement measured at the winch system by accelerometer 326 may be used in addition to, or in place of, movement measured by accelerometer 322 in the selective damping.

The combination of the damper control system 316 and the suspension system 314 (and more particularly the damper 312) enables selective damping by control of the damping force provided by the damper 312. Selective damping is described initially with reference to FIG. 3. In particular, as shown in FIG. 3 during marine geophysical surveys the system attempts to hold the sensor streamer 106 at a depth D below the surface 206 of the water. However, various factors cause changes in the relative vertical orientation of the dilt buoy 202 and the sensor streamer 106, with the largest factor being wave action at the surface 206 of the water. Other factors may include slack in the line 204 during periods of low tension and elasticity of the line 204, to name a few. Regardless of the reasons, the changes in the relative vertical orientation of the dilt buoy 202 and the sensor streamer 106 lead to distinct control actions.

Figure 4:
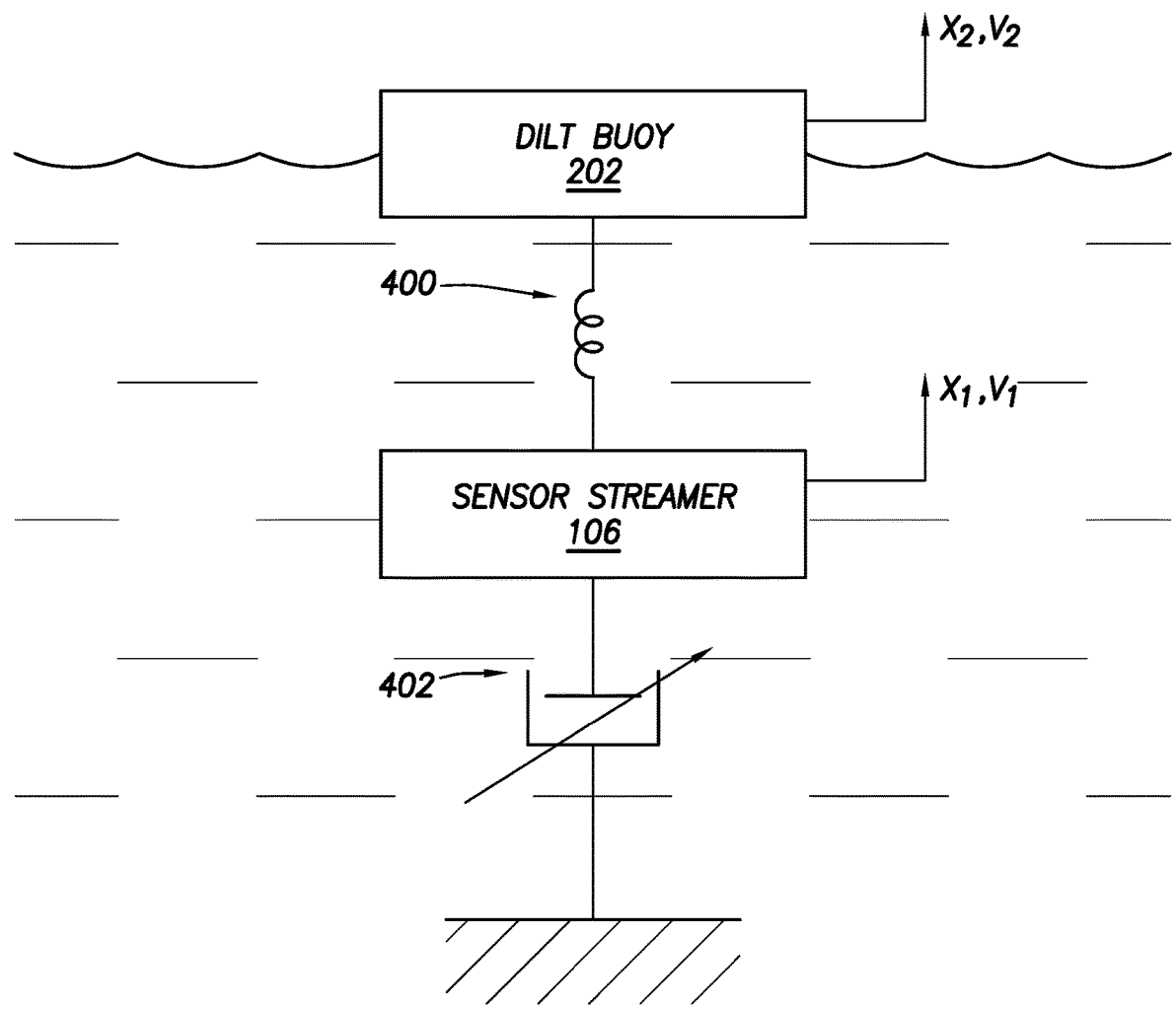
FIG. 4 shows a block diagram of a system.

FIG. 4 shows a block diagram of the dilt buoy and sensor streamer for purposes of explanation. In particular, FIG. 4 shows the dilt buoy 202 coupled to the sensor streamer 106 by way of a spring connection 400. The sensor streamer 106 is shown coupled to the sea floor by a controllable ideal damper 402. In practice, of course, the sensor streamer 106 could not be coupled to the sea floor and still be towed along as part of the geophysical survey; however, the system of FIG. 4 helps inform the discussion of the selective damping. For purposes of discussion, the vertical direction is the "X" direction, and upward movement is considered positive. Further consider each of the dilt buoy 202 and sensor streamer 106 may have a velocity V ($V_1$ for the sensor streamer and $V_2$ for the dilt buoy), and further consider that when the dilt buoy 202 and sensor streamer 106 are separating (regardless of absolute direction of travel), the relative velocity $V_{12}$ is positive.

With the assumptions in mind and still referring to FIG. 4, consider a first situation where the dilt buoy 202 is rising (i.e., has positive $V_2$ and is moving in the positive X direction), the sensor streamer 106 is rising (i.e., has positive $V_1$ and is moving in the positive X direction), but because of slack in the system the dilt buoy 202 is rising faster than the sensor streamer 106 (i.e., the dilt buoy and sensor streamer are separating, and thus $V_{12}$ is positive). For the case of FIG. 4, in the noted situation the ideal damper 402 needs to provide a downward force tending to resist the upward movement of the sensor streamer 106. Referring now to FIG. 3, in the system of FIG. 3 the damper 312 does not actively push the winch system 306 downward, and thus during periods of time when the dilt buoy and sensor steamer are both rising and are also separating (i.e., $V_{12}$ is positive), the active damper 312 is set to its lowest damping force. Thus, the following relationship is found:

$$F_D=0 \text{ when } V_1>0, V_2>0, \text{ and } V_{12}>0 \qquad (1)$$

where $F_D$ is the damping force provided by the damper 312.

Returning to FIG. 4, now consider a situation where the dilt buoy 202 is rising (i.e., has positive $V_2$ and is moving in the positive X direction), the sensor streamer 106 is rising (i.e., has positive $V_1$ and is moving in the positive X direction), but the sensor streamer 106 is rising faster than the dilt buoy 202 (i.e., the dilt buoy and sensor streamer are closing, and thus $V_{12}$ is negative). For the case of FIG. 4, in the noted situation the ideal damper 402 needs to provide a downward force to resist the upward movement of the sensor streamer 106. Referring now to FIG. 3, because the dilt buoy and sensor streamer are moving toward each other the damper 312 can provide a downward force to the winch system, and thus during periods of time when the dilt buoy and sensor streamer are both rising and are also closing (i.e., $V_{12}$ is negative), the active damper 312 is set to a higher damping force. Thus, the following relationship is found:

$$F_D \neq 0 \text{ when } V_1>0, V_2>0, \text{ and } V_{12}<0 \qquad (2)$$

where again $F_D$ is the damping force provided by the damper 312.

Returning to FIG. 4, now consider a situation where the dilt buoy 202 is rising (i.e., has positive $V_2$ and is moving in the positive X direction), the sensor streamer 106 is falling (i.e., has negative $V_1$ and is moving in the negative X direction), and thus the dilt buoy and sensor streamer are separating (i.e., $V_{12}$ is positive). For the case of FIG. 4, in the noted situation the ideal damper 402 needs to provide an upward force tending to resist the downward movement of the sensor streamer. Referring now to FIG. 3, with the dilt buoy moving upward and the sensor streamer falling, the damper 312 can provide an upward force to winch system 306, and thus during periods of time when the dilt buoy is rising and the sensor streamer is falling, the damper 312 is set to a higher damping force. Thus, the following relationship is found:

$$F_D \neq 0 \text{ when } V_1<0, V_2>0, \text{ and } V_{12}>0 \qquad (3)$$

where again $F_D$ is the damping force provided by the damper 312.

Returning to FIG. 4, now consider a situation where the dilt buoy 202 is falling (i.e., has negative $V_2$ and is moving in the negative X direction), the sensor streamer 106 is rising (i.e., has positive $V_1$ and is moving in the positive X direction), and thus the dilt buoy and sensor streamer are closing (i.e., $V_{12}$ is negative). For the case of FIG. 4, in the noted situation the ideal damper 402 needs to provide a downward force to resist the upward movement of the sensor streamer. Referring now to FIG. 3, with the relative movement of the dilt buoy and sensor streamer the damper 312 can provide a downward force to the winch system 306, and thus during periods of time when the dilt buoy is falling and the sensor streamer is rising and are thus closing (i.e., $V_{12}$ is negative), the damper 312 is set to a higher damping force. Thus, the following relationship is found:

$$F_D \neq 0 \text{ when } V_1>0, V_2<0, \text{ and } V_{12}<0 \qquad (4)$$

where again $F_D$ is the damping force provided by the damper 312.

Returning to FIG. 4, now consider a situation where the dilt buoy 202 is falling (i.e., has negative $V_2$ and is moving in the negative X direction), the sensor streamer 106 is falling (i.e., has negative $V_1$ and is moving in the negative X direction), but that the dilt buoy and sensor streamer are separating (i.e., the sensor streamer is falling faster than the dilt buoy, and thus $V_{12}$ is positive). For the case of FIG. 4, in the noted situation the ideal damper 402 needs to provide an upward force tending to resist the downward movement of the sensor streamer. Referring now to FIG. 3, with the relative movement of the dilt buoy and sensor streamer the damper 312 can provide an upward force to winch system 306, and thus during periods of time when the dilt buoy and sensor streamer are falling and separating (i.e., $V_{12}$ is positive), the damper 312 is set to a higher damping force. Thus, the following relationship is found:

$$F_D \neq 0 \text{ when } V_1<0, V_2<0, \text{ and } V_{12}>0 \qquad (5)$$

where again $F_D$ is the damping force provided by the damper 312.

Returning to FIG. 4, now consider a situation where the dilt buoy 202 is falling (i.e., has negative $V_2$ and is moving in the negative X direction), the sensor streamer 106 is falling (i.e., has negative $V_1$ and is moving in the negative X direction), but that the dilt buoy and sensor streamer are closing (i.e., $V_{12}$ is negative). For the case of FIG. 4, in the noted situation the ideal damper 402 needs to provide an upward force to resist the downward movement of the sensor streamer. Referring now to FIG. 3, with the relative movement of the dilt buoy and sensor streamer the damper 312 cannot provide an upward force to winch system 306, and thus during periods of time when both the dilt buoy and sensor streamer are falling and closing (i.e., $V_{12}$ is negative), the damper 312 is set to its lowest damping force. Thus, the following relationship is found:

$$F_D=0 \text{ when } V_1<0, V_2<0, \text{ and } V_{12}<0. \qquad (6)$$

Analysis of the various situations thus leads to the overall control philosophy of the selective damping system. In particular, the damping force provided by the damper 312 is set to its lowest damping force when the buoy and the sensor streamer are moving upward and separating, and the damping force provided by the damper 312 is also set to its lowest damping force when the buoy and the sensor streamer are moving downward and closing. For all other situations a damping force is provided by the damper 312. In practice, the damper 312 may be unable to provide a true zero damping force, but nevertheless in the example systems during the appointed times the damping force provided by the damper 312 is set to its lowest setting. In some example systems, the dichotomy between lowest damping force (i.e., $F_D=0$ from above) and application of substantial damping force (i.e., $F_D \neq 0$ from above) as a function of relative movement of the dilt buoy and sensor streamer may be implemented at all times and regardless of the frequency and/or amplitude of the waves encountered by the dilt buoy 202.

In other cases, however, the damper control system 316 is designed and constructed to implement varying degrees of damping depending on the frequency of waves being encountered by the dilt buoy 202. More particularly, example embodiments provide increased or more aggressive damping for vibrations that overlap frequencies of interest of seismic signals, and provide or implement reduced damping (if any) for vibrations whose frequencies are outside the range of frequencies of interest of seismic signals. More particularly still, example systems implement increased or aggressive damping (during times within the control philosophy where $F_D \neq 0$) for vibrations above about 2 Hertz, and implement decreased or reduced damping (again during times within the control philosophy where $F_D \neq 0$) for vibrations below about 1 Hertz. In a particular example, the systems implement increased damping (during times within the control philosophy where $F_D \neq 0$) for vibrations between 2 Hertz to 200 Hertz, inclusive, and implement reduced damping (during times within the control philosophy where $F_D \neq 0$) for vibrations below 2 Hertz. In other cases, the systems implement increased damping (during times within the control philosophy where $F_D \neq 0$) for vibrations between 2 Hertz to 30 Hertz, inclusive, and implement reduced damping (during times within the control philosophy where $F_D \neq 0$) for vibrations below 2 Hertz. In other cases still, the systems implement increased damping (during times within the control philosophy where $F_D \neq 0$) for vibrations between 2 Hertz to 10 Hertz, inclusive, and implement reduced damping (during times within the control philosophy where $F_D \neq 0$) for vibrations below 2 Hertz. In yet still other cases, the systems implement increased damping (during times within the control philosophy where $F_D \neq 0$) for vibrations between and including 2 Hertz to 4 Hertz, inclusive, and implement reduced damping (during times within the control philosophy where $F_D \neq 0$) for vibrations below 2 Hertz. Aggressive or increased damping, in the example system of FIG. 3, means that the range of damping force provided by the damper 312 (i.e., the difference in damping force as between $F_D=0$ and $F_D \neq 0$) is greater than for decreased damping situations and for a complete cycle of vibration under consideration. Decreased or reduced damping in the example system of FIG. 3 means that the range of damping force provided by the damper 312 (i.e., the difference in damping force as between $F_D=0$ and $F_D \neq 0$) is smaller for a complete cycle of vibration under consideration.

Consider first a marine geophysical survey in a location where local winds are at or near zero, and thus the only wave motion encountered by a dilt buoy 202 is the ocean swell waves. Thus, as the dilt buoy 202 moves along the surface of the water, the elongate main body 300 moves up and down responsive to ocean swell waves. As noted above, ocean swell waves have long wavelength and thus low frequency (e.g., 1 Hertz and below, and in many cases 0.1 Hertz and below). Inasmuch as the frequency of the up and down movement of the elongate main body 300 caused by ocean swell waves is low, and outside the frequency range of interest of seismic signals, in the example systems the damper control system 316 implements reduced damping (smaller changes in damping force (if any) as between $F_D=0$ and $F_D \neq 0$) such that up and down movement of the dilt buoy 202 results in similar (but phase delayed) movement of the proximal end 212 of the sensor streamer 106. That is, with the assumptions noted, the damper 312 in this situation may be set to provide a small range of resistances to relative movement (and in one case no change of resistance to relative movement) between the winch system 306 and the elongate main body 300.

Now consider a marine geophysical survey in a location where local winds have created wind waves whose frequencies are in an example 2 Hertz to 4 Hertz range. Further consider, for purposes of explanation, that there are no ocean swell waves (unlikely in an actual marine geophysical survey, but useful for explanation here). Thus, with the assumptions noted, the only wave motion encountered by dilt buoy 202 is the wind waves. As the dilt buoy 202 moves along the surface of the water, the elongate main body 300 moves up and down responsive to wind waves, and again here the movement assumed to be in the example 2 Hertz to 4 Hertz range. Inasmuch as the frequency of the up and down movement of the elongate main body 300 is within the frequency range of interest of seismic signals, in the example systems the damper control system 316 implements increased damping (larger changes in damping force as between $F_D=0$ and $F_D \neq 0$) as part of the selective damping such that the up and down movement of the dilt buoy 202 imparted to the winch system 306 (and thus the sensor streamer) is reduced or eliminated. That is, with the assumptions noted, the damper 312 in this situation may be selectively set to provide a large range of resistances to relative movement (compared to the ocean swell only case) between the winch system 306 and the elongate main body 300.

Of course, ocean swell waves are almost always present, and wind waves "ride on top" of ocean swell waves and thus the damper control system 316 should be simultaneously responsive to both as discussed in this specification. However, by being less responsive to the ocean swell waves and more responsive to wind waves with frequencies that fall within the frequencies of the seismic signals of interest, the damper control system 316 can be tuned specifically for reducing or eliminating the vibration of the sensor streamer associated with the wind waves (i.e., can implement aggressive damping for vibrations in the ranges noted). Moreover, by implementing less aggressive or reduced damping for the ocean swell waves, the active control and damping associated with the ocean swell waves is less likely to adversely affect the active damping and control associated with wind waves.

Figure 5:
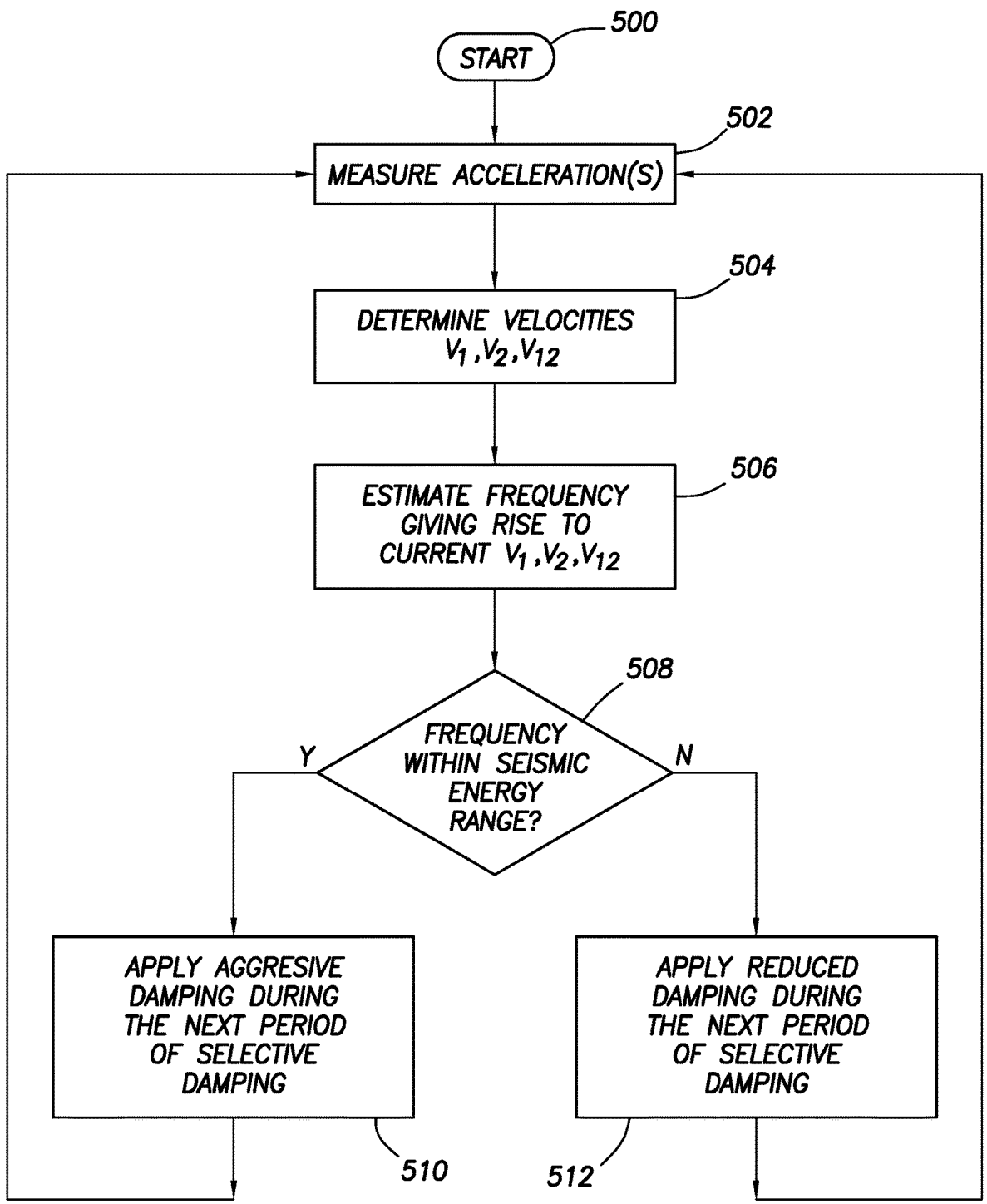
FIG. 5 shows a flow diagram of a method in accordance with at least some embodiments.

FIG. 5 shows a flow diagram of a method implemented by the damper control system 316 in accordance with example embodiments. In particular, the method starts (block 500) and proceeds to measuring acceleration using the one or more accelerometers (block 502). In some example systems, the damper control system 316 reads acceleration from a first accelerometer associated with the elongate main body 300 and reads an acceleration associated with the sensor streamer 106 (e.g., reads an accelerometer disposed at the proximal end of the sensor streamer, or reads an accelerometer coupled to the winch system 306). In other cases, discussed more below, the damper control system may read a single accelerometer (e.g., the accelerometer coupled to the elongate main body, or the accelerometer associated with the sensor streamer) and estimate movement and acceleration of the sensor streamer 106. Regardless of the precise number of accelerometers read, the next step in the example method is to determine (e.g., calculate and/or estimate) the velocities of the dilt buoy ($V_2$) and sensor streamer ($V_1$), as well as the relative velocity ($V_{12}$) (block 504). Velocity can be calculated by integrating acceleration over time.

The next step in the example method is to estimate the frequency of the up/down movement giving rise to the current relationship of the dilt buoy and sensor streamer (i.e., the current $V_1$, $V_2$, and $V_{12}$) (block 506). As discussed above, the dilt buoy 202 will in many cases be subjected to a complex array of frequencies. For example, the dilt buoy 202 may be moving on the ocean swell, and simultaneously moving on the wind waves "riding" the ocean swell, and the relative movements may be in opposite directions. Considered from the perspective of the frequency domain then, there may be several frequencies present at any given time. The analysis of the example block 506, however, is a determination of the identity of the frequency of the motion creating the current relationship of the velocities and relative velocities (i.e., the current $V_1$, $V_2$, and $V_{12}$ calculated at block 504).

The next step in the example method is a decision block on whether the frequency determined at block 506 falls within the seismic energy of range of interest (block 508). If yes, then the next step in the example method is to apply aggressive damping during the next period of selective damping (block 510). Stated otherwise, considering the situations noted in relationships (1)-(6) above, when velocities and relative velocity indicate non-zero damping force (i.e., during times within the selective damping where $F_D \neq 0$), the higher damping force is implemented by the damper control system 316 driving the damper 312 accordingly. Thereafter, the method retreats to again measuring the acceleration(s) (block 502).

Returning to the decision block 508, if the frequency of the motion creating the individual velocities and relative velocity (determined at block 506) is not within the seismic energy range (again block 508), the next step in the example method is to apply reduced damping during the next period of selective damping (block 512). Stated otherwise, considering the situations noted in relationships (1)-(6) above, when velocities and relative velocity indicate non-zero damping force (i.e., during times within the selective damping where $F_D \neq 0$), a reduced or lower non-zero damping force (as compared to the aggressive or increased case of the previous paragraph) is implemented by the damper control system 316 driving the damper 312. Thereafter, the method retreats to again measuring the acceleration(s) (block 502).

A few points regarding the example flow diagram before proceeding. Firstly, the period referred to in blocks 510 and 512 may take any suitable length. Given the periodic nature of waves impinging on the dilt buoy 202, the period may span several cycles of the highest frequency waves (e.g. may span at least one second for a predominantly 2 Hertz wind wave). In other cases, the period may span less than the full cycle of even the highest frequency wave of interest (e.g., the period may be less than a quarter second, thus covering less than a full cycle of a predominantly 4 Hertz wind wave, as an example). A shortened period implemented in either block 510 or 512 thus gives the system the ability to change the aggressiveness of damping responsive to changing conditions, even during $F_D \neq 0$ periods. For example, consider a situation where the dilt buoy 202 is rising on an ocean swell wave, but the sensor streamer is still falling (e.g., the dilt buoy just transitioned a trough of the ocean swell). Because in this example the predominant frequency of movement is associated with ocean swell, and the dilt buoy and sensor streamer are separating, the control philosophy of the selective damping dictates the damper 312 is activated at the reduced damping (i.e., lower resistance to relative movement). While in the noted condition (i.e., just transitioning a trough of the ocean swell), consider that the dilt buoy 202 encounters the rising edge of wind wave. By having a shortened period of implementation before re-measuring, determining velocities, and estimating the primary frequency giving rise to the relationships, the damper control system 316 electrically transitions the damper 312 directly from the reduced damping to the increased damping (i.e., more resistance to relative movement) in an attempt to reduce or eliminate the imparting the vertical motion of the dilt buoy 202 onto the sensor streamer 106.

Figure 6:
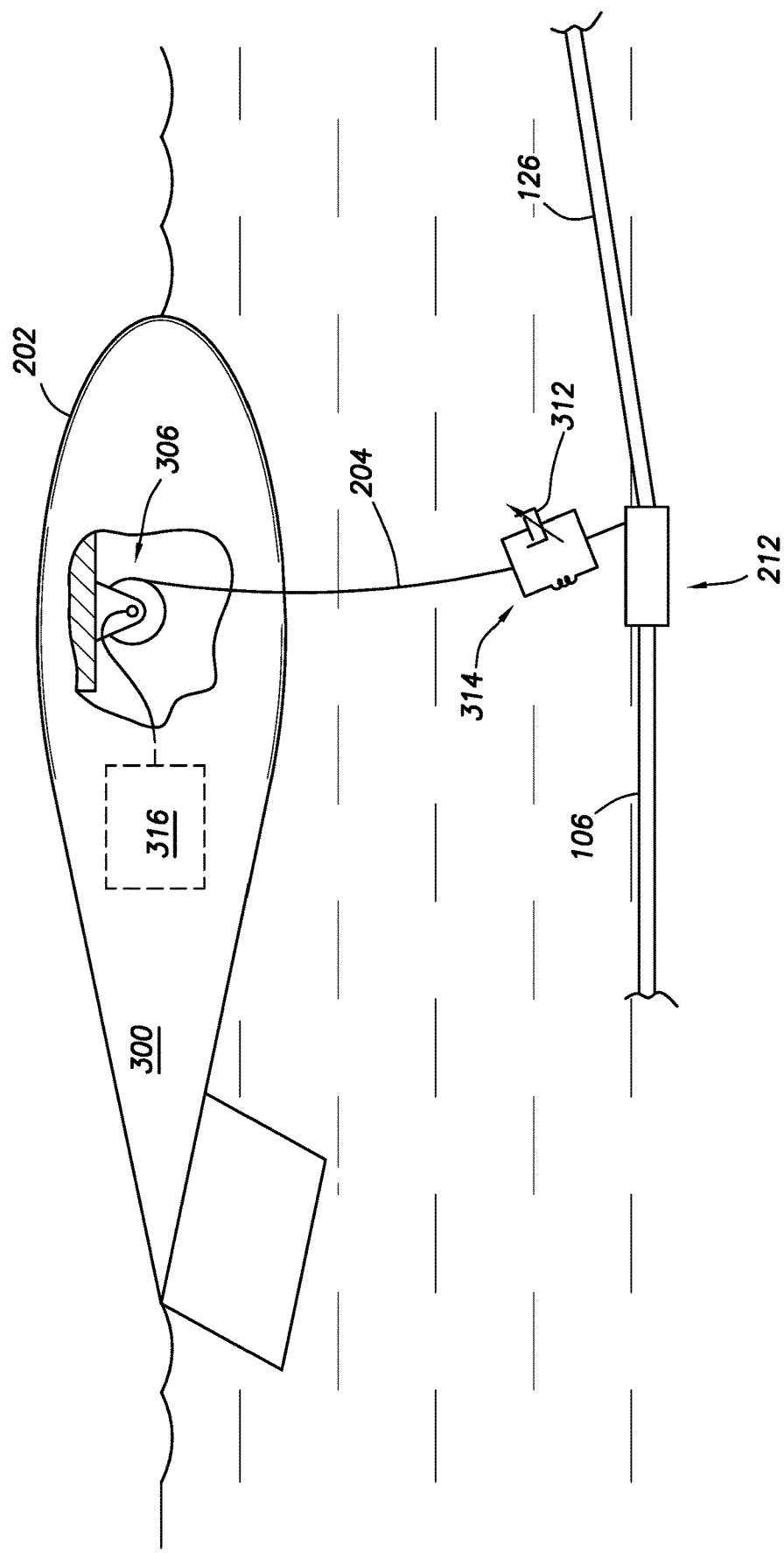
FIG. 6 shows a partial cross-sectional side elevation view of a buoy and sensor streamer in accordance with example embodiments.

The various embodiments discussed to this point have assumed that the selective damping is implemented by a damper 312 disposed in the dilt buoy 202. However, in alternative embodiments the damper may be placed at other locations. For example, FIG. 6 shows a side-elevation, partial cutaway, view of a system where the damper is disposed closer to the sensor streamer. In particular, FIG. 6 shows dilt buoy 202 coupled to the sensor streamer 106 by line 204. Disposed within the dilt buoy 202 is winch system 306, but in this case winch system 306 is rigidly coupled to the elongate main body 300. The suspension system 314, including the damper 312, is disposed between the line 204 and the proximal end 212 of the sensor streamer 106. While the suspension system 314 is shown exposed to the surrounding water, in actual use the suspension system 314 would be disposed in a water resistance container configured to enable relative movement. Though not specifically shown, the system of FIG. 6 would include at least one accelerometer rigidly coupled to the elongate main body 300 of the dilt buoy 202, and in some cases additional accelerometer(s) to directly or indirectly read acceleration associated with the sensor streamer. The example system of FIG. 6 implements the selective damping described above, and further may implement the aggressive or reduced damping as it relates to frequencies of interest. The control of the suspension system 314 may be by way of a damper control system 316 disposed within the dilt buoy 202 and communicatively coupled to the suspension system, or the damper control system may be disposed at any suitable location.

Figure 7:
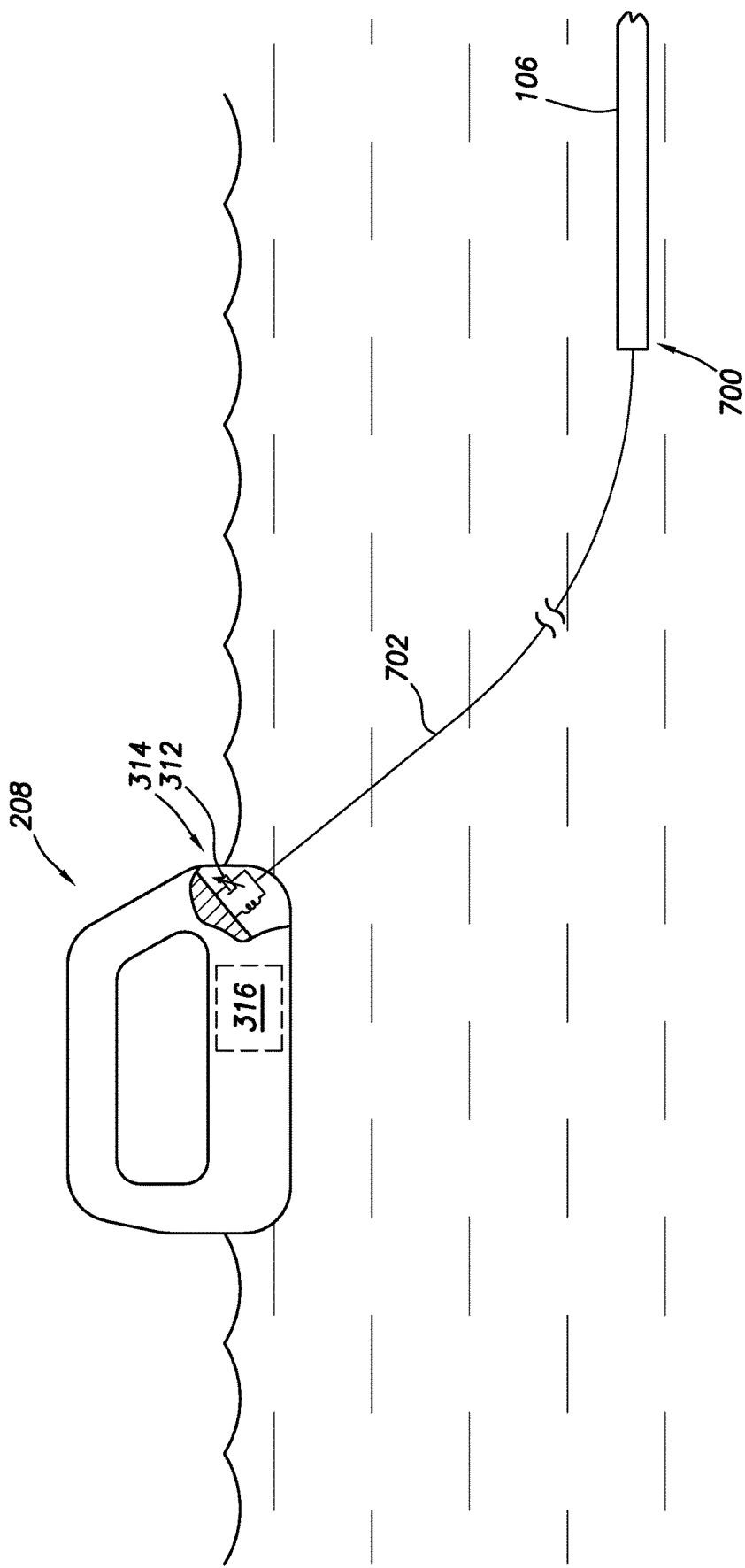
FIG. 7 shows a partial cross-sectional side elevation view of a buoy and sensor streamer in accordance with example embodiments.

Moreover, the various embodiments discussed to this point have assumed, for purposes of explanation, that selective damping is implemented only with respect to the dilt buoy 202; however, the selective damping may be implemented at any location where vibration isolation is desired. For example, FIG. 7 shows a side elevation view of a system where the damper is associated with the tail buoy, and the selective damping is implemented to reduce or eliminate vibrations imparted to the distal end of the sensor streamer. In particular, FIG. 7 shows tail buoy 208 coupled to the distal end 700 of sensor streamer 106 by a line 702. In the example system, disposed within the tail buoy 208 is a suspension system 314 including damper 312. Thus, line 702 couples to the suspended side of suspension system 314, and the opposite side of suspension system 314 rigidly couples to the tail buoy 208. Though not specifically shown, the system of FIG. 7 would include at least one accelerometer rigidly coupled to the main body of the tail buoy 208, and some cases additional accelerometer(s) to directly or indirectly read acceleration associated with the distal end 700 of the sensor streamer 106. The example system of FIG. 7 implements the selective damping described above, and further may implement the aggressive or reduced damping as it relates to frequencies of interest. The control of the suspension system 314 may be by way of a damper control system 316 disposed within the tail buoy 208 and communicatively coupled to the suspension system, or the damper control system may be disposed at any suitable location.

Figure 8B:
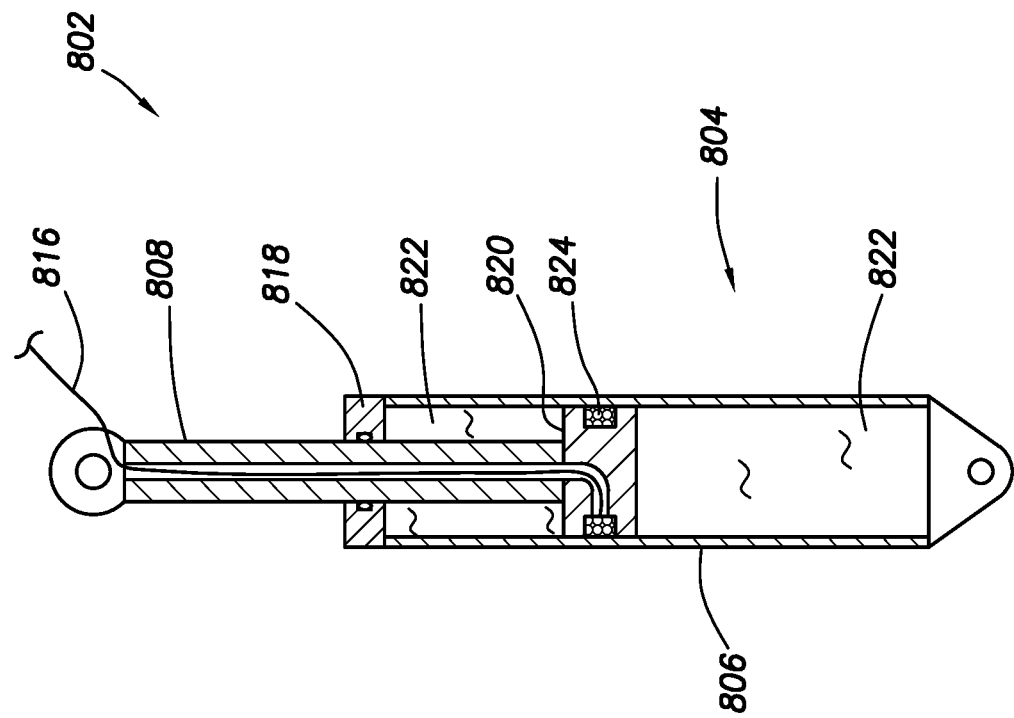
FIG. 8B shows a cross-sectional view of a damper in accordance with example embodiments.
Figure 8A:
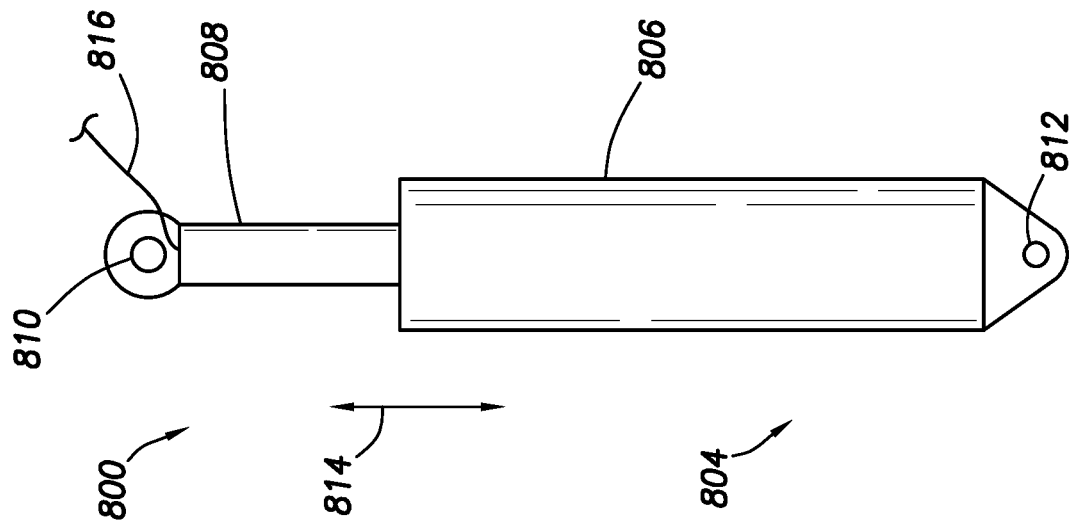
FIG. 8A shows a front elevation view of a damper in accordance with example embodiments.

FIG. 8A shows both a front elevation view 800 of a magneto-rheological (MR) damper 804 in accordance with example embodiments. FIG. 8BA shows a cross-sectional view 802 of a magneto-rheological (MR) damper 804 in accordance with example embodiments. Referring to both FIGS. 8A and 8B simultaneously, the MR damper 804 may comprise an outer cylinder 806 slidingly engaged with a piston rod 808 having an upper eyelet 810. Moreover, the outer cylinder 806 is rigidly coupled to a lower eyelet 812. The piston rod 808 telescopes into and out of the outer cylinder 806 as shown by arrows 814. Protruding from the distal end of the piston rod 808 are conductors 816 that electrically couple to internal components that control the damping force or resistance to movement provided by the MR damper 804. The cross-sectional view 802 shows example internal components of the MR damper 804 that enable the selective control of the damping force. In particular, the piston rod 808 telescopes through a bearing and seal arrangement 818 that enables the piston rod 808 to telescope in and out relative to the outer cylinder 806 while retaining the internal fluid. The piston rod 808 couples to a piston 820 that slides along an internal volume of the outer cylinder 806. An internal fluid 822 resides within the outer cylinder 806 both above and below the piston 820. As the piston rod 808 and piston 820 move within the internal volume of the outer cylinder 806, the internal fluid 822 squeezes between the piston 820 and the internal diameter of the outer cylinder 806. In the example MR damper 804, the internal fluid 822 is a magneto-rheological fluid whose viscosity is controllable based on a magnetic field to which the internal fluid 822 is exposed. The piston 820 comprises a coil 824 with a plurality of windings of electrical conductor, and the coil 824 is electrically coupled to the conductors 816. Thus, by selectively driving electrical current through the coil 824, the viscosity of the magneto-rheological fluid in the vicinity of the coil is changed. More particularly, the higher the magnetic field, the greater the viscosity, and thus the damping force provided by the MR damper 804 is controlled by selectively driving electrical current through the coil 824 which in turn creates a magnetic field.

Consider, as an example, a situation where no current is driven through the coil 824. Forces on the piston rod 808 tending to push the piston rod 808 into the outer cylinder force fluid 822 from below the piston 820 (below in the view of the figure), past the piston 820, and ultimately to the volume above the piston 820. In the absence of a magnetic field, the fluid 822 has a lower viscosity, and thus the fluid squeezes by the piston relatively easily, resulting in less resistance to movement of piston rod 808. By contrast, when electrical current is driven through the coil 824, the viscosity of the fluid 822 in the vicinity of the piston 820 increases. Again, forces on the piston rod 808 tending to push the piston rod 808 into the outer cylinder force fluid 822 from below the piston 820 (below in the view of the figure), past the piston 820, and ultimately to the volume above the piston 820. Because of the presence of the magnetic field, the fluid 822 has a higher viscosity, and thus the fluid squeezes by the piston with greater difficulty, resulting in more resistance to movement of piston rod 808. Thus, by selective control of the electrical current applied, the MR damper can be used to implement selective damping in an overall system.

The specification now turns to example embodiments where only a single accelerometer may be used, the discussion with respect to FIG. 3. In particular, as noted above the primary component imparting vibration to the sensor streamer 106 is the surface buoy, such as the elongate main body 300 of the dilt buoy 202. For any particular physical arrangement, such as shown in FIG. 3, taking into account the spring forces, elasticity of the line 204, shape of elongate main body 300 as it sits in the water, weight supported by the dilt buoy 202 and line 204, etc., a relationship between vertical movement of the dilt buoy 202 and corresponding vertical movement of the sensor streamer 106 (in the absence of damping) may be calculated or may be empirically determined. In most cases, the frequency of movement of the sensor streamer will match the frequency of movement of the dilt buoy with a certain phase delay. Moreover, the amplitude of movement of the sensor streamer will follow the amplitude of movement of the dilt buoy by a certain proportion less than one (assuming not in resonance). Thus, in alternative embodiments a single accelerometer may be used, and that single accelerometer may provide sufficient information to implement the selective damping described above. For example, the damper control system 316 may use only the acceleration of the dilt buoy 202 as measured by the accelerometer rigidly coupled to the elongate main body 300. Based on the information from the single accelerometer, the damper control system 316 may nevertheless estimate the relationship of movement of the sensor streamer 106, as well as the relative movement between the sensor streamer 106 and the dilt buoy 202, and apply the selective damping control velocity without actually measuring (directly or indirectly) the motion of the sensor streamer.

Figure 9:
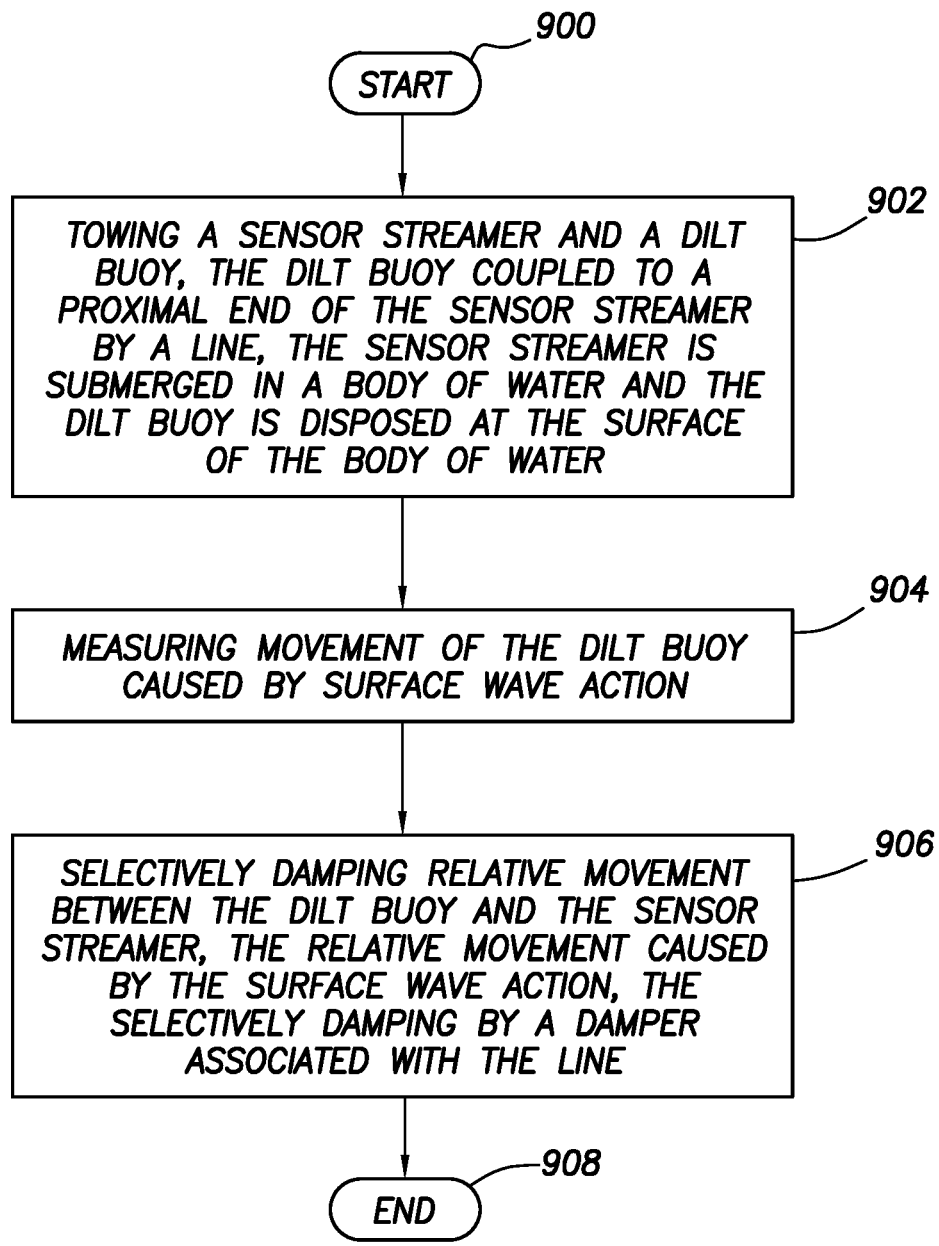
FIG. 9 shows a method in accordance with example embodiments.

FIG. 9 shows a method in accordance with example embodiments. In particular, the method starts (block 900) and comprises: towing a sensor streamer and a dilt buoy, the dilt buoy coupled to a proximal end of the sensor streamer by a line, the sensor streamer is submerged in a body of water and the dilt buoy is disposed at the surface of the body of water (block 902); and during the towing measuring movement of the dilt buoy caused by surface wave action (block 904); and selectively damping relative movement between the dilt buoy and the sensor streamer, the relative movement caused by the surface wave action, the selective damping by a damper associated with the line (block 906). Thereafter, the method ends (block 908).

In accordance with a number of embodiments of the present disclosure, a geophysical data product may be produced. The geophysical data product may include, for example, data collected in situations using damping as discussed in this specification, and recorded on a non-volatile tangible computer-readable medium 1000, such as shown in FIG. 10. Example computer-readable mediums include one or more DVD discs 1002, non-volatile solid state memory sticks (i.e., a "thumb" drive) 1004, or perhaps a more traditional "floppy" disc 1006.

The above discussion is meant to be illustrative of the principles and various embodiments of the present invention. Numerous variations and modifications will become apparent to those skilled in the art once the above disclosure is fully appreciated. For example, the specification discusses frequency of the ocean swell and wind waves, but does not delve into how the apparent frequency is affected by towed movement of the buoys through the water (i.e., Doppler Effect). If the buoys move in the same direction of the waves, the apparent frequency will be lower, and vice-versa. It is the oscillatory motion of the buoys that may impart unwanted motion on the sensor streamers, and thus the apparent wave frequency that is of primary concern. Finally, FIG. 3 discusses having the damper in the surface buoy, and other figures discuss having a damper disposed at the proximal end of the sensor streamer; however, in yet still other systems both dampers may be used (along with dampers in the tail buoy as discussed). Moreover, dampers may be placed at any suitable location, such as the spur lines, spreader ropes, lead in cables, and the like. It is intended that the following claims be interpreted to embrace all such variations and modifications.

What is claimed is:

1. A method of manufacturing a geophysical data product, the method comprising:
   obtaining geophysical data by a sensor streamer, the obtaining by:
      a proximal end of the sensor streamer by a line, the sensor streamer submerged in a body of water and the dilt buoy disposed at the surface of the body of water; and during the towing
      measuring movement of the dilt buoy caused by surface wave action; and
      selectively damping relative movement between the dilt buoy and the sensor streamer by a damper system disposed within the dilt buoy, the relative movement caused by the surface wave action, and the selectively damping by a damper associated with the line; and
   recording the geophysical data on a tangible computer-readable medium.

2. The method of claim 1 wherein selectively damping further comprises:
   implementing aggressive damping for vibrations above about 2 Hertz; and
   implementing reduced damping for vibrations below about 1 Hertz, the reduced damping measured in relation to the aggressive damping.

3. The method of claim 1 wherein selectively damping further comprises:
   implementing aggressive damping for surface wave frequencies at and above 2 Hertz; and
   implementing reduced damping for surface wave frequencies below 2 Hertz.

4. The method of claim 1 wherein measuring surface wave action further comprises:
   measuring acceleration of the dilt buoy by an accelerometer disposed on or within the dilt buoy; and
   wherein selectively damping further comprises damping based on acceleration measured by the accelerometer.

5. The method of claim 4 further comprising:
   measuring acceleration of the sensor streamer by an accelerometer; and
   wherein selectively damping further comprises damping based on acceleration measured by the accelerometer associated with the dilt buoy and the acceleration measured by the accelerometer associated with the proximal end of the sensor streamer.

6. The method of claim 5 wherein measuring acceleration of the sensor streamer further comprises measuring by an accelerometer disposed at the proximal end of the sensor streamer.

7. The method of claim 1 wherein measuring surface wave action further comprises:
   measuring acceleration of the sensor streamer by an accelerometer disposed at the proximal end of the sensor streamer; and
   wherein selectively damping further comprises damping based on acceleration measured by the accelerometer.

8. The method of claim 1 wherein selectively damping further comprises damping by way of a magneto-rheological damper.

9. A method of manufacturing a geophysical data product, the method comprising:
   obtaining geophysical data by a sensor streamer, the obtaining by:
      towing the sensor streamer and a dilt buoy, the dilt buoy coupled to a proximal end of the sensor streamer by a line, the sensor streamer submerged in a body of water and the dilt buoy disposed at the surface of the body of water; and during the towing
      measuring acceleration of the dilt buoy by a first accelerometer disposed on or within the dilt buoy;
      measuring acceleration of the sensor streamer by second accelerometer disposed on a suspended winch system within the dilt buoy;
      selectively damping relative movement between the dilt buoy and the sensor streamer based on acceleration measured by the first and second accelerometers, the relative movement caused by the surface wave action, and the selectively damping by a damper associated with the line; and
   recording the geophysical data on a tangible computer-readable medium.

10. A system comprising:
    a tow vessel floating on a surface of a body of water;
    a sensor streamer beneath the surface of the body of water;
    a lead-in cable coupled between the sensor streamer and the tow vessel;
    a buoy floating on the surface of the body of water, the buoy coupled to an end of the sensor streamer by a line;
    a damper system associated with the line between the buoy and the end of the sensor streamer, the damper system is disposed within the buoy; and
    the damper system configured to selectively damp vibrations of the buoy imparted to the sensor streamer.

11. The system of claim 10 wherein the buoy is a dilt buoy coupled to a proximal end of the sensor streamer by the line.

12. The system of claim 10 wherein the buoy is a tail buoy coupled to a distal end of the sensor streamer by the line.

13. The system of claim 10 wherein the damper system is configured to implement aggressive damping for vibrations at and above between 2 Hertz, and the damper system is configured to reduce damping for vibrations below 2 Hertz.

14. The system of claim 10:
    wherein the damper system further comprises a first damper disposed within the buoy; and the system further comprises
    a second damper disposed between the line and the end of the sensor streamer.

15. The system of claim 10 further comprising:
    a first accelerometer disposed on or within the buoy;
    wherein the damper system is configured to selectively damp vibrations based on acceleration measured by the first accelerometer.

16. The system of claim 15 further comprising:
    a second accelerometer configured to measure acceleration of the sensor streamer;
    wherein the damper system is configured to selectively damp vibrations based on acceleration measured by the first and second accelerometers.

17. The system of claim 16 wherein the second accelerometer is disposed at at least one location selected from the group consisting of: at the end of the sensor streamer; and proximate to a winch system in the buoy.

18. The system of claim 10 further comprising:
    an accelerometer configured to measure acceleration of the sensor streamer;
    wherein the damper system is configured to selectively damp vibrations based on acceleration measured by the accelerometer.

19. The system of claim 10 wherein the damper system further comprises a magneto-rheological damper.

* * * * *